United States Patent
Chien

[15] 3,640,329
[45] Feb. 8, 1972

[54] ANTI-FLAT TIRE DEVICE

[72] Inventor: Alex Chien, 345 West 3rd St., Apt. No. 8, Long Beach, Calif. 90812

[22] Filed: June 12, 1970

[21] Appl. No.: 45,766

[52] U.S. Cl..................................152/205, 152/194
[51] Int. Cl..........................................B60c 5/02, B60c 5/18
[58] Field of Search..................152/192, 193, 194, 203, 205, 152/206, 207

[56] References Cited

UNITED STATES PATENTS

| | | | |
|---|---|---|---|
| 1,323,259 | 12/1919 | Falvey | 152/206 |
| 3,443,618 | 5/1969 | Kelley | 152/206 |
| 1,060,195 | 4/1913 | Livingston | 152/207 |
| 1,733,681 | 10/1929 | Block | 152/205 |
| 1,227,289 | 5/1917 | Mermelstein | 152/205 |
| 1,923,661 | 10/1933 | Carey | 152/206 |

Primary Examiner—Arthur L. La Point
Assistant Examiner—D. W. Keen
Attorney—Ming Y. Moy

[57] ABSTRACT

This invention provides a protective segmented metal band formed by a series of metal sheets or plates arranged within a pneumatic tire casing and disposed between the tire carcass and the pressurized area thereof. Each segmented plate is secured to a continuous annular belt of flexible material by a plurality of downwardly extending legs, said plate being relatively positioned independent of the carcass of the tire.

3 Claims, 3 Drawing Figures

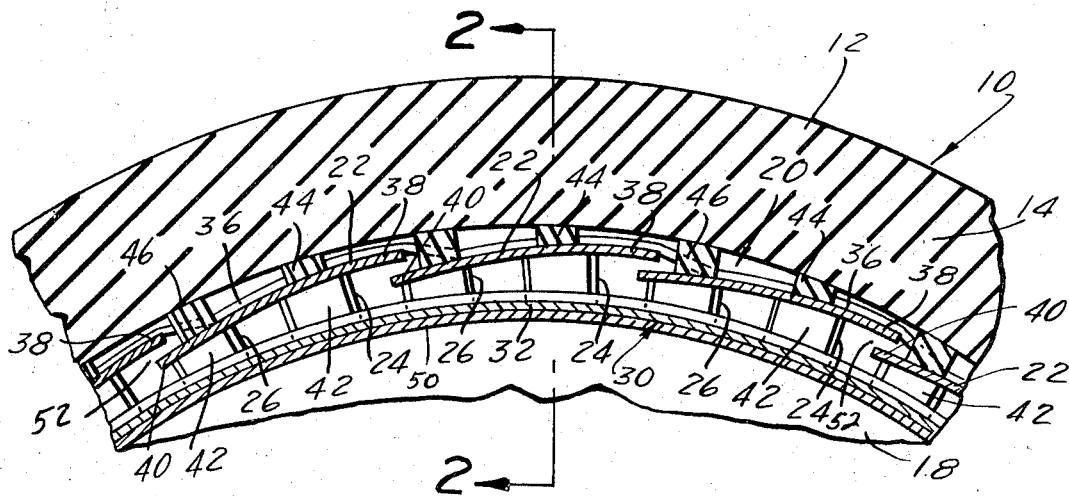
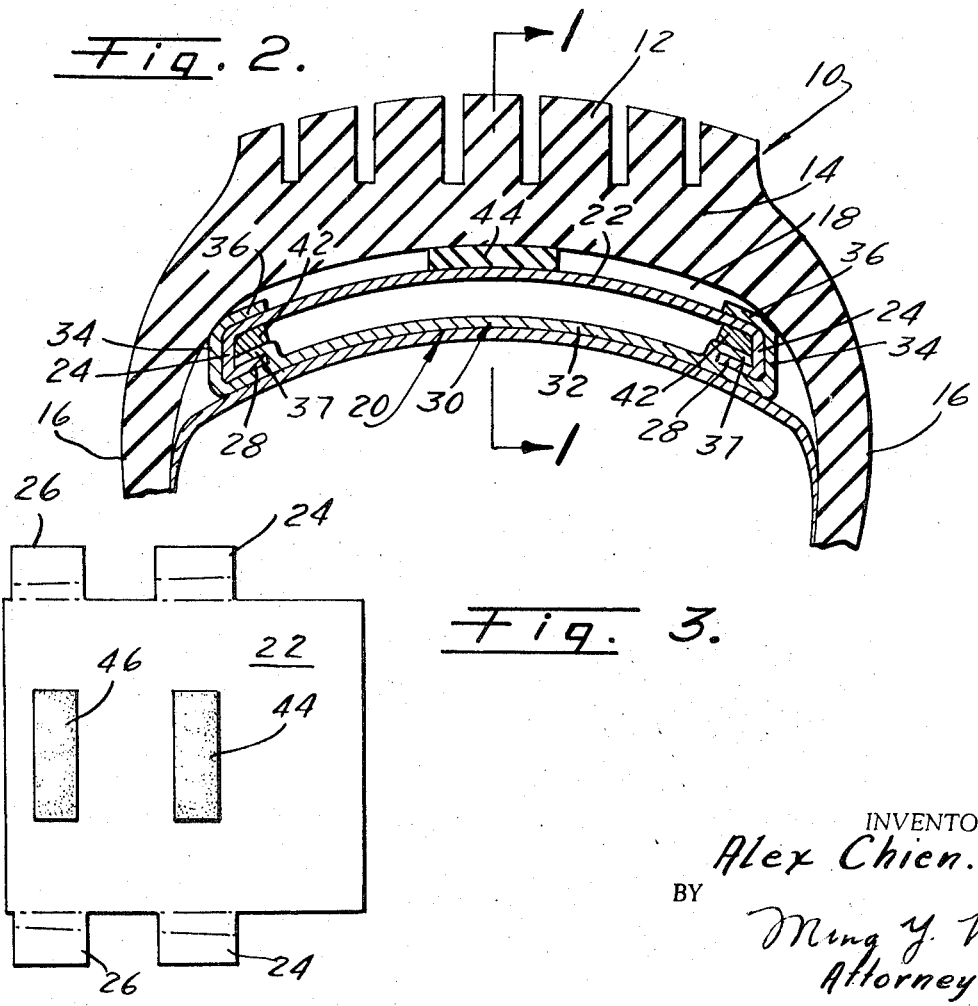

ANTI-FLAT TIRE DEVICE

CROSS-REFERENCES TO RELATED APPLICATIONS

This application is a continuation of an earlier copending application to Alex Chien, Ser. No. 697,246, now abandoned, filed Jan. 11, 1968, title Antiflat Tire Device.

BACKGROUND OF THE INVENTION

1. Field of the Invention

This invention relates generally to a device for preventing excessive air leakage from pneumatic tires and, more particularly, to a device to make tires puncture proof.

2. Description of the Prior Art

There have been many variations of punctureproof tires. However, none have been commercially feasible. In the past, there has been excessive wear due to the limited flexibility and freedom from frictional engagement. Such devices of which I am aware have limitations that create unsafe conditions as well as poor performance, not only in the tires but also in the vehicles on which the tires are used.

SUMMARY OF THE INVENTION

This invention provides a device to prevent punctures in pneumatic tires and comprises an annular segmented band composed of a plurality of plates positioned adjacent the inner surface of a tire carcass. Each plate is separated from the inner surface by spacer members secured to the outer surface of each plate segment. This then allows an air cushion to form in the space between the inner face of the carcass and the outer surface of the segmented band.

To hold each plate in its proper relationship to each other, legs are formed on the outer edges thereof. These legs extend downwardly so as to be attached to a radial burden-bearing belt. Each plate is secured in an end-to-end relationship by means of wedge-shaped members forced between a portion of the belt and the underside of the plate. The belt may be made of any suitable flexible material such as rayon, canvas or rubberized cloth. Each plate is snapped into position along the curvature of the burden-bearing belt and locked thereon by forcing the wedges into place. The unit as assembled is disposed within the annular cavity of the tires. If it is placed in a tubeless tire, a sealing wall or liner is secured to the inner sidewalls of the tire, forming a partition under the annular burden-bearing belt. However, this sealing wall is not necessary if an innertube is used within the tire cavity.

OBJECTS AND ADVANTAGES OF THE INVENTION

The present invention has as an important object the provision of a punctureproof device that is simple in construction and easy to install.

It is another object of the invention to provide an antiflat tire device that comprises a minimum number of parts or members.

It is still another object of the invention to provide an antiflat tire device that does not affect the wear of the tire.

A further object of the invention is to provide an antiflat tire device having a metal segmented band formed by a series of metal plates arranged within the tire casing and positioned between the tire carcass and a sealing belt or innertube.

A still further object is to provide an assembled unit to be inserted within the cavity of a tire in order for said tire to withstand puncturing from sharp objects.

Another object of the invention is to provide an antiflat tire device having an armor-clad protection of high tensile and impact strength to form a super punctureproof shield.

Still another object of the invention is to provide a device having a metal band with features of flexibility and freedom from frictional engagement which can effect a smooth performance within a tire.

The characteristics and advantages of the invention are further sufficiently referred to in connection with the following detailed description of the accompanying drawings, which represent one embodiment. After considering this example, skilled persons will understand that many variations may be made without departing from the principles disclosed and I contemplate the employment of any structures, arrangements or modes of operation that are properly within the scope of the appended claims.

BRIEF DESCRIPTION OF THE DRAWINGS

Referring to the drawings, which are for illustrative purposes only:

FIG. 1 is a sectional view of the invention taken on line 1—1 of FIG. 2;

FIG. 2 is a sectional view taken on line 2—2 of FIG. 1: and

FIG. 3 is a plan view of one of the metal segments showing the legs thereof before they are bent into a mounting position.

DESCRIPTION OF THE PREFERRED EMBODIMENT

Referring now to the drawings, there is shown a typical tire, indicated generally at 10, having a tread portion 12, a carcass 14 and sidewalls 16. Each of the above define a tire cavity 18. Disposed within this cavity is a device or apparatus comprising an annular segmented band, which is generally indicated at 20. This band is made up of a plurality of individual plates 22 which act as punctureproof shields. It is preferred that said plates be made from a rigid punctureproof material and, therefore, said plates are shown as composed of metal, but a fiberglass-reinforced plastic may be used.

Along the outer edges of the plates there is provided two pairs of legs. The front pair of legs is indicated by reference character 24 and the rear pair of legs is indicated by the numeral 26. Each leg is bent downwardly from the crown curvatured plate and bent inwardly again at 28 to form a somewhat C-shaped configuration. It is to be noted that the front legs 24 are longer in relationship to the rear legs 26. This is due to the fact that they are disposed and attached to an annular burden-bearing belt 30. The belt 30 comprises an annular, substantially flat portion 32, said flat portion having along its outer edges a radial flange 34 which is upturned to cover the sides of the legs 24 and 26. An inwardly extending lip 36 is formed on the outer radial edge of the flange 34 whereby a portion of the plate is covered. In addition, the radial belt includes a pair of oppositely disposed inverted L-shaped flanges 37 for receiving the lower bent portion 28 of each leg 24 and 26, respectively.

Each plate member 22 is placed within the belt 30 whereby each plate is overlapped by the succeeding plate. That is, as shown in FIG. 1, the front end portion 38 of each plate 22 overhangs or overlaps the preceding rear end portion 40 of each plate, thereby preventing any given area from being completely punctured.

The belt 30 is to be formed of a pliable material such as rayon, canvas or any rubberized cloth. This, then, allows for each plate to be positioned thereon by bending and flexing members 32, 34 and 36, respectively. Once a plate is placed in its proper position, a securing means, shown in FIGS. 1 and 2 as a wedge 42, is forced between the bottom surface of plate 22 and the flange member 36 on each side of the assembly.

To effect a smooth performance within the tire, flexibility and freedom from frictional engagement with the tire is required. This is accomplished by spacer means placed between the inner annular wall of the carcass and the plate 22. This means is represented as resilient blocks 44 and 46, respectively. Each block is secured to the outer surface of each plate segment, as can be seen in FIG. 3.

When a unit is completely assembled and positioned within the tire cavity between the under surface of the tire carcass 14 and an air-sealing liner 50, which is sealed at its outer edges by cement or other usual fastening means, there is established an air cushion area therebetween, as indicated at 52. This air cushion area prevents frictional engagement between parts and other elements, as can be seen in FIG. 1.

However, it should be noted that an innertube may be used in place of the air-sealed liner 50 to form the pressurized section of the tire 10.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned, except as defined in the accompanying claims.

I claim:

1. A punctureproof device for a pressurized pneumatic tire comprising:

a plurality of segmented plates composed of punctureproof material, said plates having a plurality of downwardly extending legs, and wherein each segmented plate comprises an overlapping front portion and a downwardly extending rear portion, which is overlapped by said front portion of the succeeding plate in a circumferential arrangement within the tire cavity;

a spacer means secured to the surface of each of said plates, whereby said plates are spaced from frictional engagement with the inner surface of the tire;

an annular pliable belt adapted to receive said plates for positioning thereon, wherein said annular pliable belt comprises: a substantially flat annular portion having radial flanges disposed along each outer edge thereof, said flanges being upturned along said legs and bent horizontally to form a support cover for each of said segmented plates; and a pair of oppositely disposed, annular, inner flanges adapted to receive the lower inwardly turned legs of said plates; and securing means for securing said segmented plates in end-to-end relationship to each other about the annular belt, said securing means comprising wedge-shaped members force fitted between said plate and said annular belt.

2. A punctureproof device, as recited in claim 1, wherein said spacer means comprises a pair of spacer blocks, said blocks being formed of a resilient material.

3. A punctureproof device, as recited in claim 2, including an air-sealing liner having outer edges, said edges being bonded to the inner portion of the tire, forming an air support for said belt.

* * * * *